United States Patent [19]

Brown

[11] Patent Number: 5,072,309
[45] Date of Patent: Dec. 10, 1991

[54] INFORMATION RETRIEVEL ARRANGEMENT INCLUDING FACSIMILE APPARATUS

[75] Inventor: Sanford S. Brown, Lincroft, N.J.

[73] Assignee: AT&T Bell Laboratories, Murray Hill, N.J.

[21] Appl. No.: 473,783

[22] Filed: Feb. 2, 1990

[51] Int. Cl.$^5$ ................... H04N 1/32; H04M 11/00
[52] U.S. Cl. ................... 358/434; 358/403; 379/100
[58] Field of Search ................... 358/402, 403, 434; 379/100, 88

[56] References Cited

U.S. PATENT DOCUMENTS

| | | | |
|---|---|---|---|
| 4,340,783 | 7/1982 | Sugiyama et al. | 179/2 A |
| 4,893,333 | 1/1990 | Baran et al. | 379/100 |
| 4,907,274 | 3/1990 | Nomura et al. | 379/100 X |
| 4,918,722 | 4/1990 | Duehren et al. | 379/100 X |
| 4,974,254 | 11/1990 | Perine et al. | 358/403 |

FOREIGN PATENT DOCUMENTS

| | | | |
|---|---|---|---|
| 2024561 | 1/1980 | United Kingdom | 358/403 |
| 2160072 | 4/1985 | United Kingdom | |

OTHER PUBLICATIONS

Procedures for Document Facsimile Transmission in the General Switched Telephone Network, Fascicle VII. 3-Rec. T.30.; p. 81, Section 3.3; Most Relevant.

Primary Examiner—Benjamin R. Fuller
Assistant Examiner—Eric Frahm
Attorney, Agent, or Firm—John A. Caccuro

[57] ABSTRACT

An information retrieval system includes an interactive operating mode which enables a user at a facsimile machine to receive multiple facsimile messages, each in response to a separate user request, during a single communication connection to the system. In one arrangement, the first facsimile message includes a menu of services provided by the system and subsequent facsimile messages contain information obtained in response to user selections made from that menu. The operation of a predefined button or entry of a predefined feature code at the facsimile machine is used to establish the interactive mode thereat and to signal the system to also establish the interactive mode of operation. The interactive mode is terminated at both the facsimile machine and system by the user 1) hanging up or the system timing out, 2) by the user entering a termination code, or 3) by the system sending a terminate command to the facsimile machine.

19 Claims, 3 Drawing Sheets

FIG. 3

| INFORMATION REQUEST | ENTER CODE | ⟩ 301 |
|---|---|---|
| STOCKS | 01 | |
| BONDS | 02 | |
| MUTUAL FUNDS | 03 | 302 |
| ⋮ | ⋮ | |
| CD RATES | 10 | |
| AFTER ENTERING CODE PRESS RETRIEVE BUTTON | | ⟩ 303 |

FIG. 4

| INFORMATION REQUEST | ENTER SELECTION | ⟩ 401 |
|---|---|---|
| STOCKS | ■ | |
| BONDS | ☐ | |
| MUTUAL FUNDS | ☐ | 402 |
| ⋮ | ⋮ | |
| CD RATES | ☐ | |
| AFTER ENTERING CODE PRESS RETRIEVE BUTTON | | ⟩ 403 |

INFORMATION RETRIEVEL ARRANGEMENT INCLUDING FACSIMILE APPARATUS

TECHNICAL FIELD

The present invention relates to image communication apparatus, and more particularly, to a facsimile-apparatus-based information retrieval arrangement.

BACKGROUND OF THE INVENTION

In the course of conducting commercial or personal business, it is common for an individual to access sources of information which are not locally available. The desired information is typically retrieved in a variety of ways including calling someone and obtaining the information verbally, calling someone and having a copy of the information sent by the United States mail or shipped by an overnight delivery service, and by using a personal computer (PC) to access a database. More recently, another technique which uses the caller's facsimile machine to output information from a database has been developed. Such an arrangement typically operates autonomously requiring a user to select the desired information using touch tone signals entered in response to voice messages outputted by the information providing equipment. While the information retrieval systems which utilize facsimile machines have worked well, there is a continuing desire to increase the capabilities and performance of such systems.

SUMMARY OF THE INVENTION

The present invention provides users with an improved method and apparatus for retrieving information and delivering paper copies of information to requesters rapidly and at low cost. In prior art systems, individuals wishing to retrieve information from data bases had to dial-in and log-on to the data base, and were then presented with a tree structured menu designed to guide the user to the desired information. Typically, such systems used a user's PC display or synthesized voice to present the user with a number of choices—typically 3 to 10. The user would then respond to the system by typing characters on the PC or dialing a sequence of touch tone signals. Based on that input, the system repeats the process with another set of choices again and again, until the information desired by the user is identified. That information was then presented to the customer using the PC display, via fax, or by any of a number of alternative means. The present invention recognizes that the processing of information identification is slow and cumbersome, and often results in a misdirected search which has to be restarted from the beginning.

According to the present invention, an information retrieval system (data base system) is arranged with an interactive operating mode which is enabled by a user at a remote facsimile apparatus. When the interactive operating mode is first established, a preselected facsimile message is outputted to user's facsimile apparatus. The preselected facsimile message, in one embodiment, provides the user with a menu of information services provided by the system and data needed by the user to make information requests from the system. In response to an information request signal received from a user, the system selects the information desired by the user and outputs that information in facsimile form to the user. According to the present invention, during one established connection to the system, the user can make multiple information requests, one at a time, from the system. The system remains connected to the user's facsimile apparatus until 1) the user either hangs up or the system times out, 2) the user enters a feature termination code, or 3) the host system 140 sends a terminate command to facsimile machine.

Thus, according to this invention, the user has much easier and faster access to a data base system. In one embodiment, after dialing the data base system, the user receives a greeting prompting him or her to press a predesignated button (illustratively called "Retrieve") to get a copy of the instructions and/or menu of information. After pressing the Retrieve button, the user is immediately, on-line, faxed a copy of the instructions or menu. The user finds this advantageous because he or she does not have to remember or take notes of a long list of options, and because of the hard copy, the user can be immediately provided with a much broader range of options. This allows the user to identify immediately the information desired, without having to go through numerous "layers" of a voice message touch tone response menu structure, and avoids the possibility of going down the wrong path and having to restart the process.

BRIEF DESCRIPTION OF THE DRAWING

In the drawing,

FIGS. 3 and 4 are illustrative examples of facsimile messages outputted to the user during the operation of the present invention.

DETAILED DESCRIPTION

Figure 1:
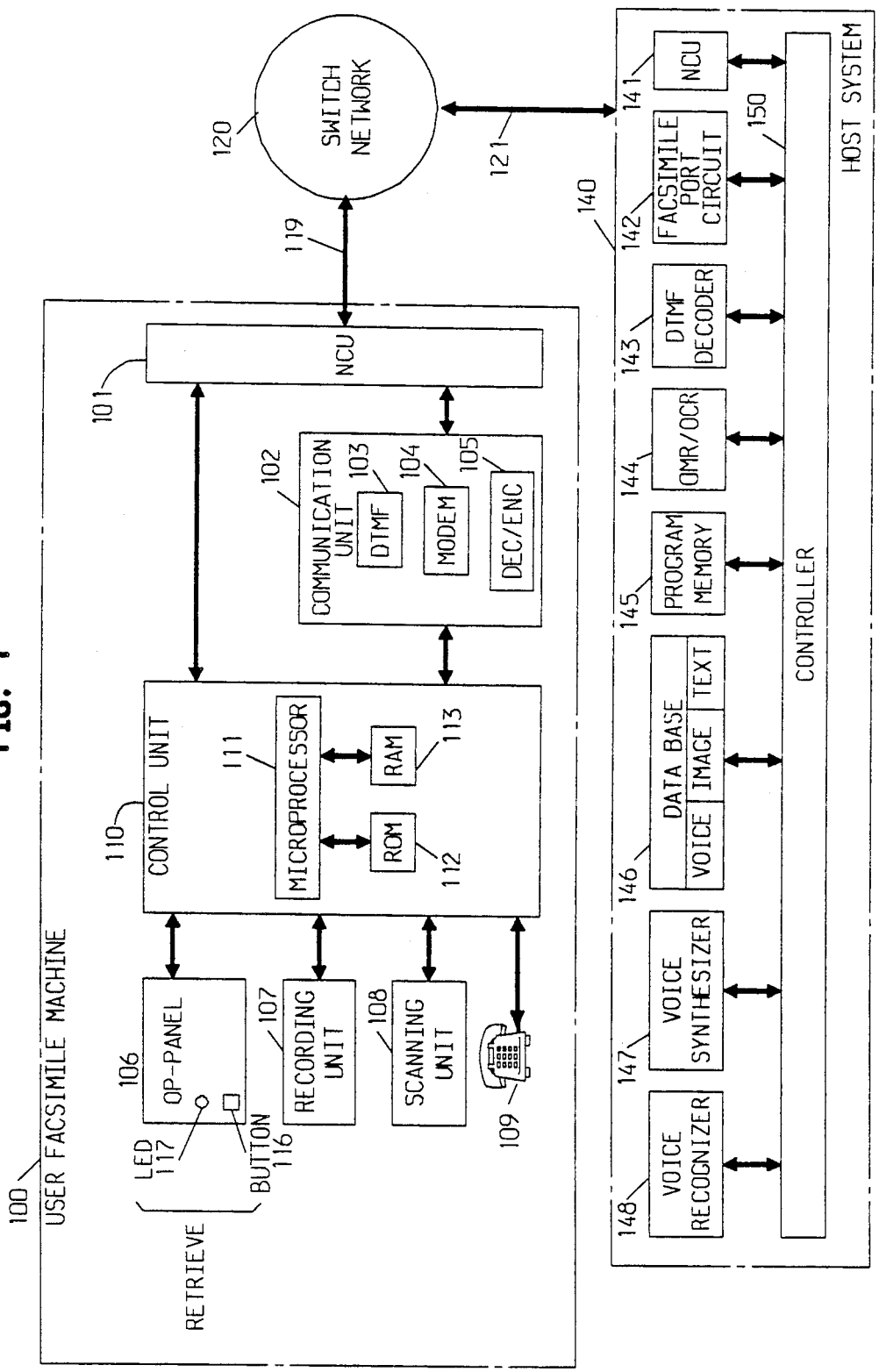
FIG. 1 shows a block diagram of one embodiment of an information retrieval arrangement useful in describing the operation of the present invention.

Shown in FIG. 1 is a block diagram of an illustrative embodiment of an information retrieval arrangement using facsimile apparatus or machine 100 connected via telephone switch network 120 to a host information retrieval system 140. In the drawing, Network Control Unit (NCU) 101 controls, in a known manner, the interface to switch network facility 119. Facility 119 connects the facsimile machine 100 to telephone switch network 120. NCU 101 enables signaling (including ISDN signaling capability) and voice/data communications between the facsimile machine 100 and facility 119.

Communication unit 102 interfaces NCU 101 to control unit 110. The communication unit 102 contains a modem 104 for modulating and demodulating the image signal and a decoder/encoder 105 for decoding and encoding an image signal. This unit also contains a Dual Tone Multi Frequency (DTMF) generator 103 which is used to dial outgoing calls using, e.g., touch tone signaling.

The control unit 110 controls the operation of facsimile machine 100. Control unit 110 operates under program control to control the operations of NCU 101, communication unit 102, telephone 109, operator panel 106, recording unit 107 and scanning unit 108. Control unit 110 includes a microprocessor 111 and ROM 113 and RAM 112 which store the programs necessary to perform the standard facsimile functions and the various features and functions of the present invention.

The operator panel 106 contains buttons or switches and a display which enable the user to operate and input information to the facsimile machine. In accordance with one embodiment of the present invention, a retrieve feature button 116 is used to enable the interactive operating mode of the host system 140. Retrieve button 116 has associated therewith a light emitting diode LED 117 or similar visual indicator to indicate to facsimile machine users that the retrieve feature has been activated.

The recording unit 107 is typically a printer unit which generates a hard copy of the received facsimile message. The scanning unit 108 is used to read, in a well-known manner, the image of the document to be transmitted by the facsimile machine.

The switch network 120 enables connection, via facilities 119 and 121, between facsimile 100 and host document distribution system 140. Switch network 120 may be a key telephone system, a private branch exchange (PBX), a control office switch or any other well-known switch apparatus.

The host information retrieval or document distribution system 140 includes Network Control Unit (NCU) 141 which controls the interface of host system 140 to switch network facility 121. NCU 141 provides signaling (including ISDN signaling capability) and voice/data communications under control of controller 150. Facsimile port circuit 142 operates in a well-known manner to provide an interface which converts test and graphics data to facsimile data signals for transport over facility 121. The text and image data are obtained from data base 146 by controller 150 in response to specific user requests.

Data base 146 stores the voice, image and text files which may be accessed by the user at facsimile machine 100. Data base 146 may, illustratively, be implemented using well-known floppy disk memory, hard disk memory or equivalent memory.

Voice synthesizer 147 operates under control of controller 150 to convert the data accessed from the voice files into a voice signal for output to the user facsimile machine 100 via NCU 141. Voice synthesizer 147 may be implemented using well-known circuitry.

DTMF decoder 143 operates in a well-known manner to decode dual tone multi-frequency (e.g., touch tone) signals received from the user into a data format utilized by controller 150. Additionally, well known Optical Mark Recognizer (OMR) and/or Optical Character Recognizer (OCR) 144 are used to recognize user graphical responses entered on documents read by facsimile machine 100. These user responses or inputs, as will be discussed in a later paragraph, can be entered by the user to designate selected host system-provided services desired by the user.

Controller 150 includes a microprocessor or other type of computer which operates under program control. Program memory 145 stores the operating system, programs to control the various units (141-148) and information retrieval programs including the program necessary to implement the flow chart steps of FIG. 2 which are performed by the host system 140.

Because the operations of the above-mentioned units of the facsimile machine 100 and host system 140 are well known, their operation will not be further described. However, where the operation of any of these units is modified in accordance with the present invention, that unit's operation will be described more completely. Thus, using the figures and description of this specification as a guide, the operations of the present invention should be integrated into the hardware and program control structure of facsimile machine 100 and host system 140 so as to compatibly cooperate with the standard features and operations thereof.

Figure 2:
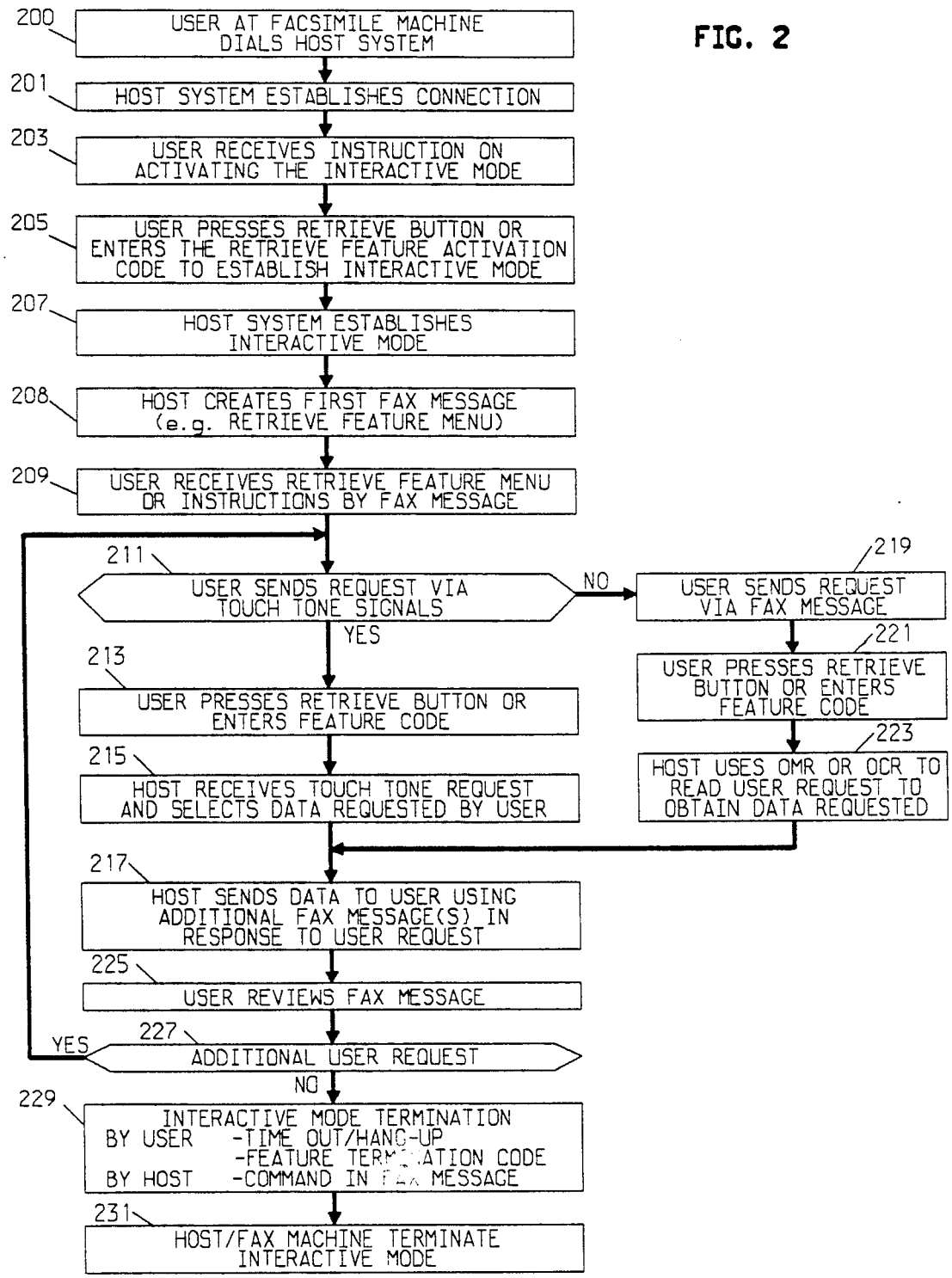
FIG. 2 is a flow diagram of the operation of the arrangement of FIG. 1 in accordance with the present invention.

The following description jointly references the block diagram of FIG. 1, the operation flow diagram of FIG. 2 and the facsimile messages of FIGS. 3 and 4. In the following description, the first digit of an element's reference number designates the figure where that element is located (e.g., 201 is located in FIG. 2).

In step 200, a user at facsimile machine 100 dials a connection to the host system 140 in a well-known manner. That is, the user goes off hook at the handset and dials the host number. In step 201, the controller 150 of host system 140 answers the call and establishes a connection to the facsimile machine 100. Thereafter, the controller 150 accesses the data base 146 to obtain a voice message which instructs the user how to enable the interactive operating mode. In step 203, the voice message is constructed by voice synthesizer 147 and outputted via NCU 141 to the user's facsimile machine 100.

The interactive mode, in accordance with the present invention, provides the user at facsimile machine 100 with the ability, during the course of a single call connection, to switch between voice transmission, receiving a facsimile (fax) message and sending a fax message under control of host system 140.

While the disclosed method provides new interactive capabilities, it is important to note that CCITT recommendation T.30 has a number of procedures which may be utilized to support such interactive capabilities. These procedures are commonly used in current fax machines to implement features such as "voice request" and "free polling".

According to one feature of the present invention, the interactive mode is enabled when the user activates a variety of system features. For example, the interactive mode is enabled when the user activates a continue feature or a retrieve feature. The user activates the retrieve feature step 205, by pressing the Retrieve buttom 116 or entering, via touch tone signaling, the retrieve feature activation code.

Assuming the user has pressed the retrieve button 116, an enable signal is sent from facsimile machine 100 to host system 140. In response thereto, the controller 150 of host system 140 activates the retrieve feature of the interactive operating mode, in step 207, and creates the first fax message for output to the user. The first fax message may be a preselected fax message containing a menu of retrieve feature services available from the host system 140. The controller 150, in step 208, accesses the data base 146 to obtain a retrieve feature menu in text and image form, which is then outputted as a fax message to the user. The retrieve feature menu fax message may, illustratively, be of the form shown in FIGS. 3 or 4. The retrieve feature menu includes data instructions (e.g., 301, 303) to enable the user to request or select the information (e.g., 302) he or she desires from the host system. For example, the FIG. 3 fax message informs the user that he or she should enter the code associated with the particular information requested from host system 140. Thus, in step 211, the user enters, via touch tone signaling, code 01 if stock information is desired, code 02 if bond information is desired, etc.

Step 211 assumes that a FIG. 3 fax message is received by the user who then presses the appropriate buttons of the telephone 109 key pad of facsimile machine 100 to select the desired information requested. The user then presses the Retrieve button (or equivalently enters the retrieve feature code) which serves as an "end of string" delimiter to indicate to host system 140 that the user entry is completed.

In step 215, touch tone decoder 143 decodes the user input and controller 150 accesses data base 146 in a well-known manner to obtain the information requested by the user. In step 217, the controller 150 enables the facsimile port circuitry 142 to output the requested information to the user's facsimile machine 100.

Alternatively, according to another feature of the present invention, the user may enter his or her request using the retrieve feature menu fax message of FIG. 4 which has been filled in with the user's information request. In step 219, the user inserts the filled-in menu fax into the scanning unit 208 of facsimile machine 100 to transmit his or her information request to host system 140. As illustrated by the FIG. 4 fax message, instructions 401 guide the user to mark the box associated with his or her selection 402 and to press the Retrieve button 403 at the conclusion of the fax transmission to the host system 140.

In step 223, NCU 140 signals controller 150 that a fax message is received and OMR/OCR unit 144 is used to read or detect the user selection entered on the fax message of FIG. 4. Controller 150 uses the user's selection to obtain the desired information from database 146. Again, in step 217 this information is arranged in a fax message format and sent to the user's facsimile machine 100.

In yet another alternative embodiment, (not illustrated by the flow chart of FIG. 2), the user may verbally enter selection commands via telephone 109 of facsimile machine 100. In such an embodiment, voice recognizer 148 of host system 140 decodes the user's selection. Thereafter, controller 150 accesses the data base 146 to obtain the requested information which, in step 217, is sent to the user using fax messages as previously described.

Thus, according to the present invention, the user may select the requested information using either the touch tone request method (steps 211-215), fax message request method (steps 219-223) or the voice request method. After having received the additional fax message containing the requested information in step 217, the user, in step 225, reviews the received fax messages. In step 227, the user decides if additional information should be requested.

Note, as part of the requested information, the host system 140 may output another more detailed menu of additional information which is available from the host system 140. This additional menu can be used to enable the user to request and retrieve additional information from host system 140. If additional information is requested, the user can again enter that new request in step 211. This additional information retrieval request is handled in the same manner by host system 140 as previously described in steps 211-225.

When no additional information is requested by the user, the retrieve feature may be terminated, in step 229, by the user either 1) hanging up or the system timing out, 2) by the user entering a feature termination code, or 3) by the host system 140 sending a terminate command to facsimile machine 100. In response to any of the above feature termination requests, the host system 140 and the facsimile machine 100 both terminate the interactive mode retrieve feature) in our example.

It will thus be appreciated that those skilled in the art will be able to devise numerous arrangements which, although not explicitly shown or described herein, embody the principles of the invention and are within its spirit and scope.

I claim:

1. An information retrieval system comprising
   means responsive to an enable signal received during a communication connection to a remote facsimile apparatus for establishing an interactive operating mode, said enable signal not including any facsimile encoded data,
   means for outputting a preselected facsimile message to said remote facsimile apparatus upon receipt of said enable signal during said communication connection, and
   means operative during said established interactive mode and responsive to an information request signal received from said remote facsimile apparatus for selecting information from said system for output to said user in a form of an additional facsimile message.

2. The system in claim 1 wherein said preselected facsimile message outputted to said remote facsimile apparatus includes a menu of services provided by said system and data required from a user at said remote facsimile apparatus to select from said menu of services.

3. The system of claim 1 further comprising
   means for recognizing user entered data as part of a facsimile message received from said remote facsimile apparatus and using said data as said request signal.

4. The system of claim 1 further comprising
   means for recognizing verbal messages received from a user at said remote facsimile apparatus and using said verbal messages as said request signal.

5. The system of claim 1 further comprising
   means for decoding touch tone signals received from said remote facsimile apparatus and using said touch tone signals as said request signal.

6. The system of claim 1 wherein said request signal is a data signal received from said remote facsimile apparatus over a data channel of said communication connection.

7. The system of claim 1 further comprising
   means for terminating said interactive mode in response to a termination command signal generated by said system and outputted to said remote facsimile apparatus.

8. The system of claim 1 further comprising
   means for terminating said interactive mode in response to the absence of receipt of said request signal within a predetermined time period following an output of a facsimile message to said remote facsimile apparatus.

9. The system of claim 1 further comprising
   means for terminating said interactive mode in response to receiving a termination signal from said remote facsimile apparatus.

10. A facsimile machine comprising
    means for dialing a communication connection to a remote data base system,
    means responsive to a user input for enabling an interactive operating mode at said facsimile machine and for sending an enable signal, said enable signal not including any facsimile encoded data, over said connection to enable an interactive operating mode at said system, which outputs a preselected facsimile message to said facsimile machine during said connection and which enables said user at said facsimile machine to make multiple separate information requests to said system during said connection and to receive a separate facsimile message from said system in response to each of such requests.

11. The facsimile machine of claim 10 wherein said enabling means is a pushbutton.

12. The facsimile machine of claim 10 further comprising means for terminating said interactive operating mode in response to an input from said facsimile machine user and for sending a terminating signal to said system.

13. A facsimile machine comprising means for dialing a communication connection to a remote data base system over a communication facility, and means operable by a user for sending an enable signal during said communication connection to said system requesting a receipt of a facsimile message therefrom listing a menu of services available from said system and data required by said user at said facsimile machine to activate such services of said remote data base system during said communication connection, said enable signal not including any facsimile encoded data.

14. An information retrieval arrangement including a data base system and a remote facsimile apparatus connectable thereto, said arrangement comprising said data base system including, means responsive to an enable signal received during a communication connection to said remote facsimile apparatus for establishing an interactive operating mode, said enable signal not including any facsimile encoded data, means for outputting a preselected facsimile message to said remote facsimile apparatus after the establishing of said interactive mode during said communication connection, and means operative during said established interactive mode and responsive to an information request signal received from said facsimile apparatus for selecting information from said system for output to said user in a form of an additional facsimile message; and said remote facsimile apparatus including, means for dialing said connection to said data base system, means responsive to a user input for enabling an interactive operating mode at said facsimile machine and for sending said enable signal, said enable signal not including any facsimile encoded data, over said connection to enable said interactive operating mode at said system to thereby enable the user at said remote facsimile apparatus to receive a preselected facsimile message during said connection and to enable the user to send said information request signal to said data base system apparatus and to receive a separate facsimile message from said data base system in response to said information request signal.

15. A method of operating a data base system comprising the steps of establishing an interactive operating mode in response to a receipt of an enable signal received over a communication connection from a remote facsimile apparatus, said enable signal not including any facsimile encoded data, outputting a preselected facsimile message to said remote facsimile apparatus upon receipt of said enable signal during said communication connection, and selecting information for output to said remote facsimile apparatus, as one or more additional facsimile messages, using a request signal received over said connection following the establishment of said interactive operating mode.

16. The method of claim 15 further comprising the step of terminating said interactive mode in response to the absence of receipt of said request signal within a predetermined time period following an output of a facsimile message to said remote facsimile apparatus.

17. The method of claim 15 further comprising the step of terminating said interactive mode in response to receiving a termination signal from said remote facsimile apparatus.

18. The method of claim 15 further comprising the step of terminating said interactive mode in response to a termination command signal generated at said system.

19. A method of operating a facsimile machine during a communication connection to a remote facsimile message distribution system, comprising the steps of sending an enable signal over an established connection to enable an interactive operating mode at said system, which automatically outputs a preselected facsimile message over said connection to said facsimile machine, said enable signal not including any facsimile encoded data, in response to said preselected facsimile message received from said system, transmitting an information request signal to said system using data received in said facsimile message, and receiving additional information as one or more additional facsimile messages from said system.

* * * * *

UNITED STATES PATENT AND TRADEMARK OFFICE
CERTIFICATE OF CORRECTION

PATENT NO. : 5,072,309
DATED : December 10, 1991
INVENTOR(S) : Sanford S. Brown

It is certified that error appears in the above-indentified patent and that said Letters Patent is hereby corrected as shown below:

On the Title page, item [54], col. 1, line 1, "RETRIEVEL" should read -- RETRIEVAL--.

Signed and Sealed this

Seventeenth Day of August, 1993

*Attest:*

BRUCE LEHMAN

*Attesting Officer*     *Commissioner of Patents and Trademarks*